Jan. 30, 1951        L. W. WATERS        2,540,020

PEACH ORIENTING MACHINE

Filed Jan. 19, 1948        4 Sheets—Sheet 1

INVENTOR.
LAURENCE W. WATERS
BY
Mellin + Hanscom
ATTORNEYS

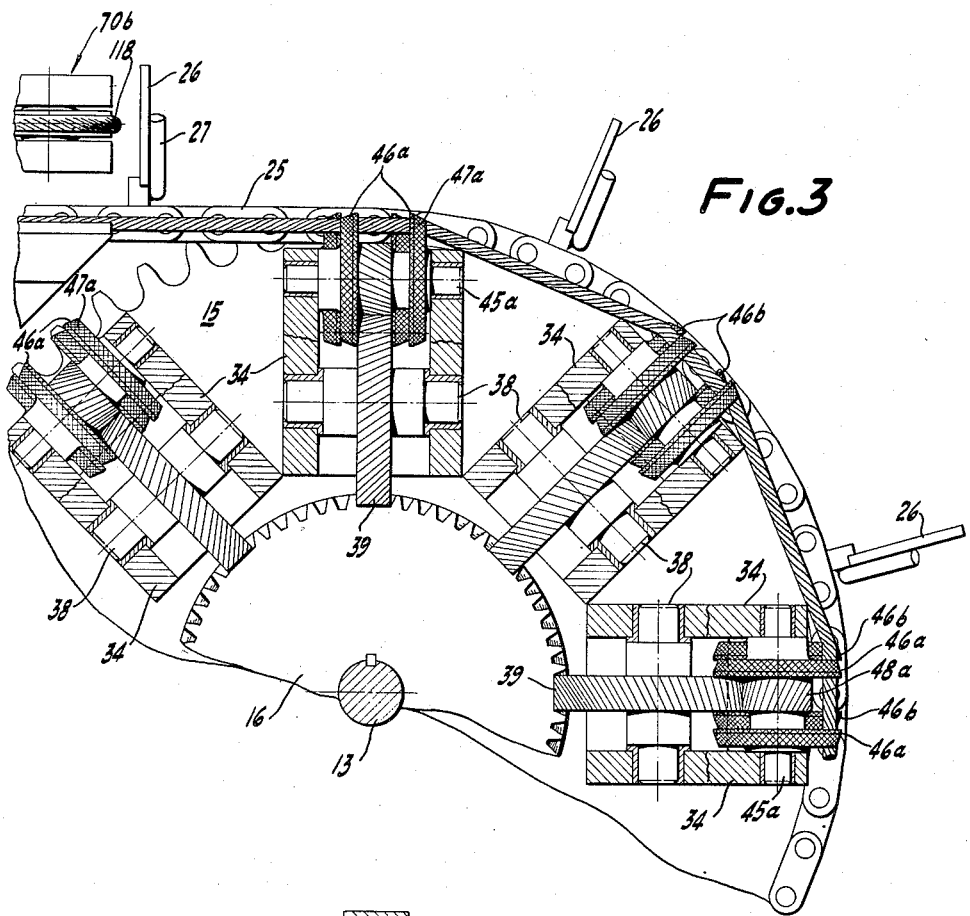
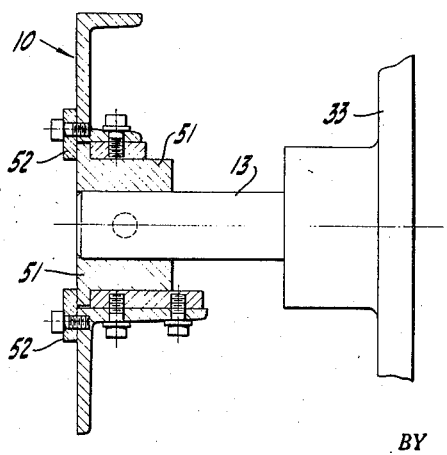

Jan. 30, 1951      L. W. WATERS      2,540,020
PEACH ORIENTING MACHINE
Filed Jan. 19, 1948      4 Sheets-Sheet 4
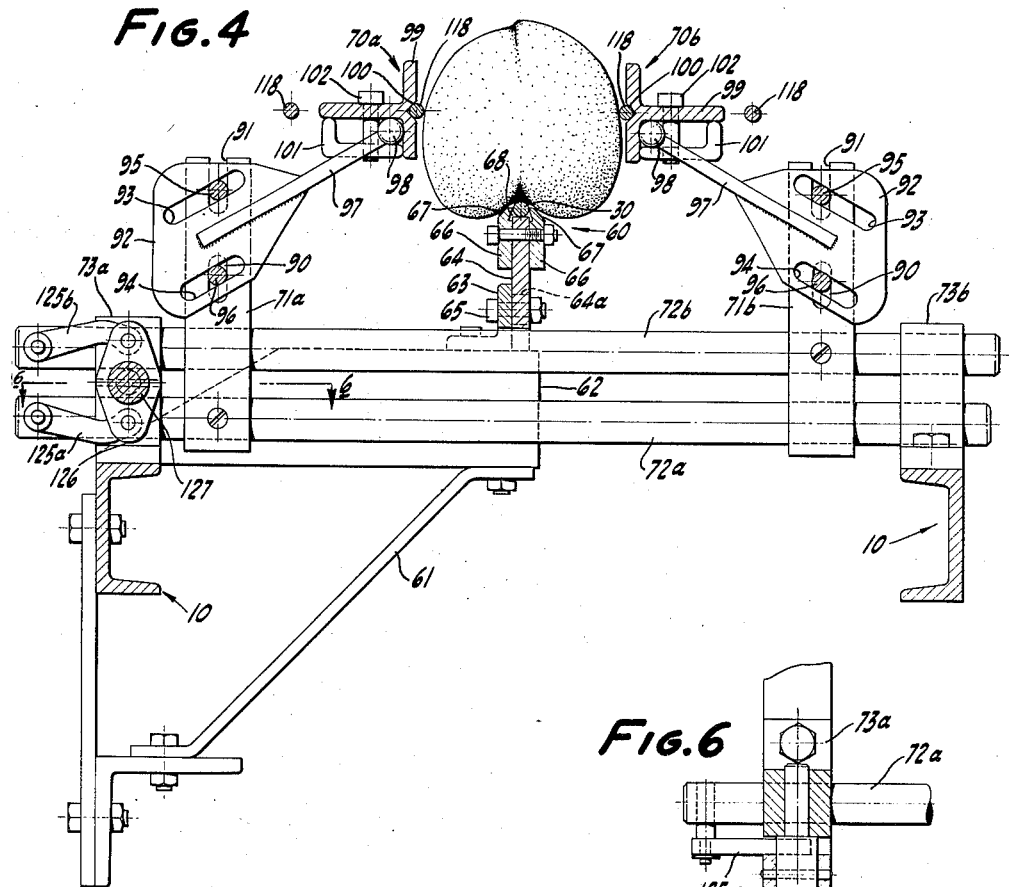
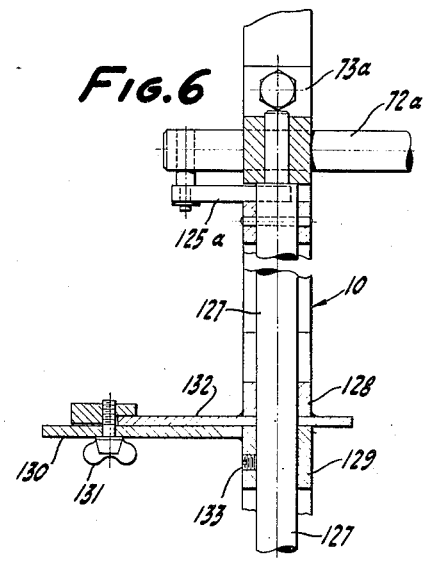
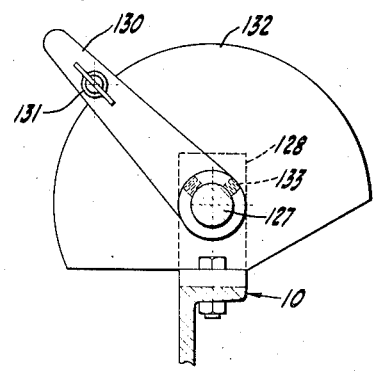
INVENTOR.
LAURENCE W. WATERS
BY
Mellin + Hanscom
ATTORNEYS Patented Jan. 30, 1951

2,540,020

UNITED STATES PATENT OFFICE 2,540,020

PEACH ORIENTING MACHINE

Lawrence W. Waters, Ontario, Calif., assignor to Atlas Imperial Diesel Engine Co., Oakland, Calif., a corporation of Delaware Application January 19, 1948, Serial No. 2,994

15 Claims. (Cl. 198—33)

This invention relates to an apparatus for automatically and continuously aligning or orienting peaches and other like drupaceous fruit.

In canneries, it is common practice to pit peaches and other like fruit of the stone variety by means of automatic pitting machines. These machines are of various types, but in all or most of them the fruit is introduced into the machines, either manually or automatically, with the suture plane and the cleft of the fruit in predetermined position. Thus, in one type of pitting apparatus, peaches are impaled upon an impaling element. In impaling each peach, it must be presented with the cleft of the fruit toward the impaling element and the suture in a vertical plane. In another type of apparatus, the peach is placed between spaced pairs of blades, with the suture plane parallel to the blades and lying between them.

It has been the practice heretofore to align or orient peaches and other like fruit for delivery to pitting machines and the like, either manually or by machinery that is relatively slow or inefficient in operation.

It is an object of the present invention to provide an apparatus which efficiently performs the function of aligning or orienting peaches for delivery to a pitting machine or the like.

It is a further object of the invention to provide an apparatus and a method whereby peaches and other like fruit may be fed with random orientation to a delivery station and continually forwarded to a receiving or removal station, at which latter point each peach will be in properly aligned or oriented position, such that an operator can pick up a peach and by a simple mechanical movement, without bothering to inspect the peach, bring it into the proper position for feeding to the impaling element, cutting blade or the like of a pitting machine.

It is a further object of the invention to provide an apparatus that is capable of receiving peaches or the like at a delivery station in a condition of random orientation, continuously propelling the fruit toward a removal or pick-up station, imparting to the peaches a spinning motion operative to align or orient each peach, and interrupting the spinning motion of each peach at the moment of alignment, sufficiently to maintain the peach in properly oriented condition for the remainder of its travel to the removal station.

These and other objects of the invention will be apparent from the following description and the appended claims.

My invention will be better understood by reference to the accompanying drawings, in which:

Fig. 1 is a side elevation, partly broken away, of the apparatus of the invention.

Fig. 3 is a detailed and enlarged fragmentary view, with parts broken away, of one of the sprocket-and-gear assemblies of the apparatus of the invention.

Fig. 4 is a transverse section taken along the line 4—4 of Fig. 1.

Fig. 5 is a transverse section along the line 5—5 of Fig. 1.

Fig. 6 is a fragmentary, longitudinal section taken along the line 6—6 of Fig. 4; and Fig. 7 is a longitudinal section taken along the line 7—7 of Fig. 1.

Figure 2:
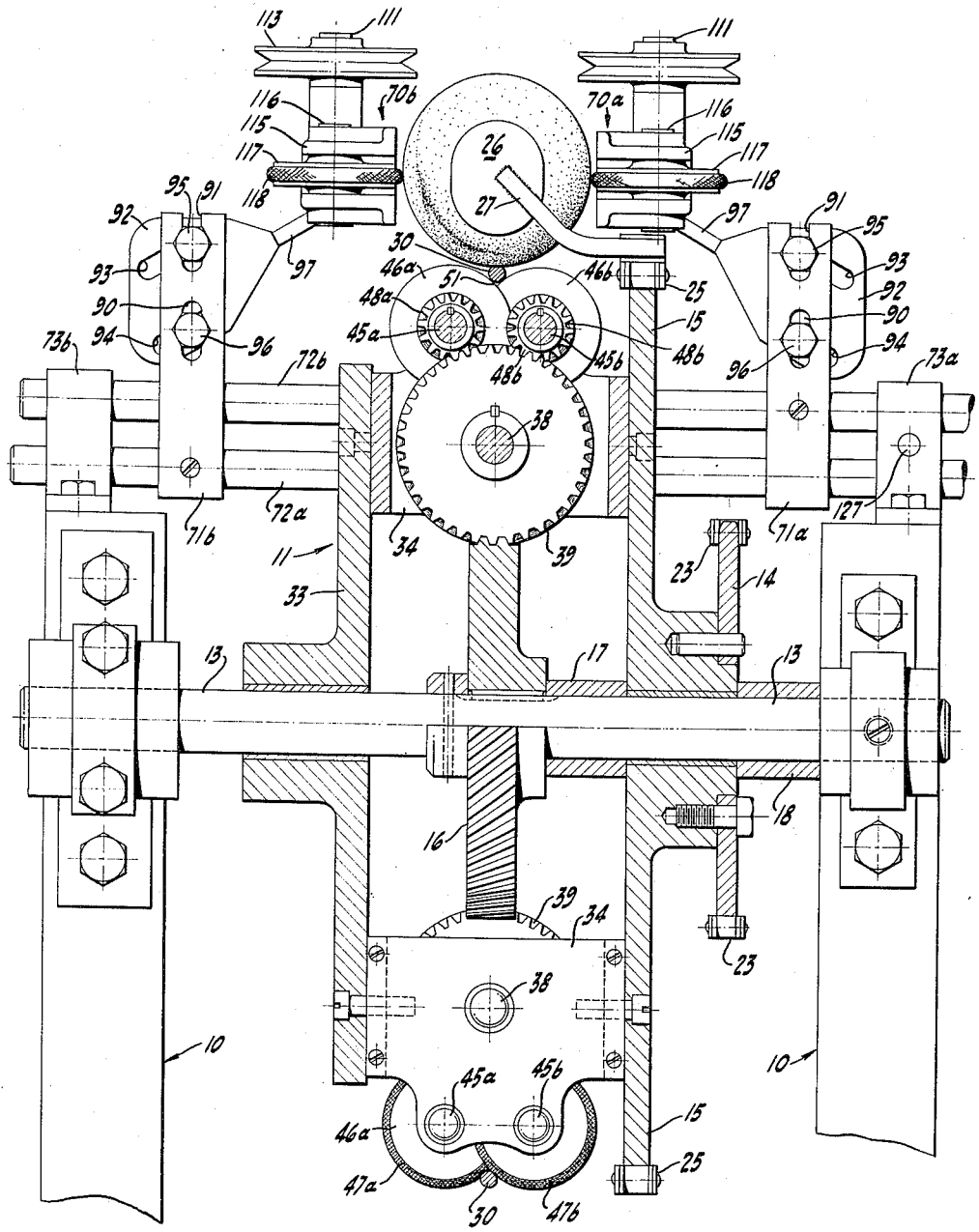
Fig. 2 is a transverse section taken along the line 2—2 of Fig. 1.

Referring now to the figures of the drawings, a main frame 10 supports a spaced pair of sprocket and gear assemblies generally designated as 11 and 12, each of which is rotatably mounted on a fixed shaft 13 journaled in suitable bearings in main frame 10. Front or feed-end sprocket assembly 11, as shown more clearly in Fig. 2, comprises a small sprocket 14 bolted onto the hub of a large sprocket 15, which is rotatably mounted on fixed shaft 13, and stationary worm gear 16 keyed to fixed shaft 13. Sleeves or spacers 17 and 18 confine sprocket 15 on shaft 13. Small sprocket 14 (see Fig. 1) is powered by motor 20 through gear box 21, sprocket 22 and endless chain 23 engaging the teeth of sprockets 22 and 14. The construction of rear or discharge-end sprocket assembly 12 is identical with that of front sprocket assembly 11, except for the absence of small sprocket 14 and except for an adjusting mechanism associated with rear assembly 12, as described hereinafter. Sprocket assembly 12 is powered by sprocket assembly 11, as described in detail hereinbelow.

An endless chain 25 passes around large sprocket wheels 15, engaging the teeth thereof. At regular, spaced intervals a series of paddles or fruit pushers 26 are attached to the links of chain 25 by means of laterally extending arms 27. The fruit pushers have the function of propelling the fruit from the receiving station to the delivery station of the machine as will be described.

An endless cable 30 paralleling but spaced laterally from endless chain 25, is carried and operated by sprocket assemblies 11 and 12 in the manner now to be described. Referring more particularly to Figs. 1, 2, and 3, a carrier plate 33 of smaller diameter than sprocket 15 is journaled on fixed shaft 13. At regularly spaced intervals about the circumference of plate 33 pairs of bearing plates 34 are positioned and each is rigidly secured at one end to carrier plate 33 and at the opposite end to sprocket 15. Journaled in the centers of each pair of bearing plates 34, at right angles to fixed shaft 13, is a shaft 38 to which is keyed a rotatable worm gear 39 meshing with stationary worm gear 16. Also journaled in bearing plates 34 are parallel roller shafts 45a and 45b. To shaft 45a are keyed a spaced pair of identical beveled rollers 46a each having a knurled surface 47a, and between rollers 46a, in meshing relationship to worm gear 39, is a pinion 48a, also keyed to shaft 45a. Similarly keyed to shaft 45b are a spaced pair of beveled, knurled rollers 46b having knurled surfaces 47b and a pinion 48b positioned between rollers 46b keyed to shaft 45b and meshing with worm gear 39.

As shown more clearly in Figs. 2 and 3, rollers 46a are offset relative to rollers 46b a distance about equal to the roller thickness, and each adjacent pair of rollers 46a, 46b overlaps so as to present a cusp-shaped path or channel 51 (see Fig. 2). Also, the pair of adjacent rollers 46a, 46b at one end of shafts 45a, 45b face oppositely to the pair of rollers 46a, 46b at the other end of shafts 45a, 45b. The aforementioned endless cable 30 is looped about the rollers 46a, 46b so as to be carried in cusp-shaped channels 51. The rollers 46a, 46b are so positioned that cable 30, at all points where it lies within a cusp 51, and chain 25 are equi-distant from the axis of shaft 13. Or, stated otherwise, any line paralleling shaft 13 and bisecting cable 30 also bisects a link of chain 25. This placement of rollers 46a, 46b and of cable 30 in relation to chain 25 results in movement of cable 30, chain 25 and paddles 26 at the same linear velocity. Also, as will be seen more clearly in Fig. 2, the rotation of sprocket assemblies 11 and 12 will cause rotation of cable 30 about its longitudinal axis, this rotary movement being imparted to cable 30 as follows: As main sprocket 15 rotates about shaft 13, worm gears 39 also rotate about this shaft. Engagement of each gear 39 with the corresponding fixed gear 16 during rotation about shaft 13 causes gears 39 to rotate about their own axes which, in turn, engage pinions 48a and 48b on the shafts of rollers 46a and 46b, thus causing these rollers to rotate in the same direction about their own axes and, by engaging cable 30, rollers 46a and 46b cause cable 30 to rotate about its longitudinal axis. It is apparent that the speed of rotation of cable 30 can be predetermined for any given rate of rotation of sprocket assemblies 11 and 12, by appropriate design of the gear ratios of worm gears 16, 39, 48a and 48b.

Referring now more particularly to Figs. 1 and 5, the spacing of sprocket assemblies 11 and 12 longitudinally of the frame 10, to accommodate chains and cables of different lengths and to take up slack, is accomplished by means of a bolt 50 bearing against a flanged collar 51 in which one end of shaft 13 of sprocket assembly 12 is seated. There is also provided, as shown, a track 52 for the flange of collar 51, check nuts 53 to adjust the bolt 50 to and lock it in the desired position, and a set screw 54 to lock the collar 51 and shaft 13 in the adjusted position.

Referring now more particularly to Fig. 4, a fruit locating member generally designated as 60 is provided, which serves to locate and hold the fruit in properly aligned position and also defines a passageway for the cable 30. Locating member 60 is supported on main frame 10 by spaced brackets 61 and 62. Bolted to the upper surfaces of upper brackets 62 is an angle iron 63. A flat beam 64 is bolted to the upright leg of angle iron 63 by bolts 65 passing through ovate slots 64a in beam 64, thus permitting vertical adjustment of fruit locating member 60. Bolted to the upper portion of beam 64, and on opposite faces thereof, are a pair of identical, oppositely disposed fruit locating plates 66 having inwardly tapering edges 67, which serve an important orienting function as explained hereinafter and which also define a channel 68 to receive cable 30. The outer surfaces of edges 67 slant upwardly and inwardly, toward one another, and terminate below the top surface of cable 30 but, preferably, above the center of cable 30. Advantageously, edges 67 terminate about midway between the center and top of cable 30.

Lateral guide members generally designated as 70a and 70b are provided above and spaced laterally from cable guide 60. These lateral guides are supported upon posts 71a and 71b, respectively. Posts 71a are bolted to transverse shafts 72a while posts 71b are bolted to transverse shafts 72b, which are similar to but are positioned above shafts 72a. Shafts 72a and 72b are slidably journaled through posts 73a and 73b, which are bolted to opposite sides of main frame 10. Shafts 72a and 72b can thus be displaced laterally by sliding through posts 73a and 73b, thus permitting lateral adjustment of guides 70a and 70b. This lateral adjustment is accomplished by a mechanism later to be described.

Returning now to lateral guides 70a and 70b, each of the posts 71a and 71b is provided with a vertical slot 90 at about its mid portion and with an open-ended vertical slot 91 in its top portion. A bracket 92 having diagonal slots 93 and 94 is bolted to each post 71a and 71b by means of bolts 95 and 96 passing through the registering slots of the post and bracket. An arm 97 terminating in a transverse bar or rod 98 is secured to each bracket 92. The guide assembly proper, supported by bracket 92, arm 97 and rod 98, consists of a pair of identical but oppositely disposed T irons 99, each provided with a V-shaped groove 100 on the face or top portion or bar of the T. The engagement of each T iron 99 and rods 98 is secured by an L section 101 and bolts 102 threaded through the leg of T iron 99 and each L section 101.

It is apparent that by means of bolts 95 and 96 engaging the diagonal and vertical slots 90, 91, 93 and 94 in posts 71a and 71b and brackets 92, the guide mechanisms 70a and 70b can be readily adjusted vertically and horizontally.

Referring now more particularly to Figs. 1 and 2, the left hand end portion (in the view of Fig. 1) of each T beam 99 is provided at one end with a notched or forked section forming a pulley cage 110. Journaled into opposing sections of pulley cage 110 is a shaft 111 to which are keyed, at one end (within cage 110) a driven pulley 112 and, at the opposite end, a driving pulley 113 which in turn is driven by belt 114 communicating with any suitable source of power (not shown). At the opposite end of each T beam 99 is a similar pulley arrangement, comprising pulley cage 115, pulley shaft 116 and pulley 117, but without a driving pulley corresponding to pulley 113. Looped about each pair of pulleys 112 and 117 is an endless cable 118, which, as shown in Fig. 4, traverses and lies within V-shaped 100 of T-beam 99.

As mentioned hereinabove, a mechanism is provided for shifting transverse shafts 72a and 72b, and through them the lateral guides 70a and 70b, whereby the spacing of guides 70a and 70b is accomplished. Adjacent ends of shafts 72a and 72b are connected by links 125a and 125b to a crank 126, which is keyed to a longitudinal shaft 127. Shaft 127 is rotatably journaled in posts 73a and also in a bearing member 128, which is bolted to frame 10 and is located midway of the shaft. Rigidly secured to shaft 127 adjacent bearing member 128 is a collar 129 provided with a lever 130 having a key 131 extending therethrough near the outer end of the lever. A sector 132 is rigidly secured to bearing member 128 adjacent lever 130. It will be seen that, by turning lever 130 to the right or left, shaft 127 will rotate, which, acting through crank 126 and links 125a and 125b, will cause transverse shafts 72a and 72b to shift equally but oppositely, thus adjusting the spacing of lateral guides 70a and 70b. With lateral guides 70a and 70b suitably spaced, key 130 is turned to engage sector 132, thus serving to lock shaft 127 to the sector. A set screw 133 locks lever 130 to shaft 127. Sector 132 may be provided with indexing to indicate the spacing of lateral guides 70a and 70b.

In operation, motor 20 is started, which acting through gear box 21, sprocket 22 and endless chain 23, revolves front sprocket-and-gear assembly 11. The resulting rotary motion of large sprocket 15 engaging endless chain 25 moves the endless chain linearly and causes corresponding rotation of rear sprocket-and-gear assembly 12. At the same time, intermediate, movable worm gear 30 engaging stationary worm gear 16 revolves and, acting through pinions 48a and 48b on the shafts 45a and 45b, causes rotation of rollers 46a and 46b on their respective shafts. Endless cable 30 is thus given a linear motion at the same rate as chain 25 and, also, a high speed rotary motion about its longitudinal axis.

Meanwhile, endless cables 118 of lateral guides 70a and 70b will have been set in motion through belts 114 and pulleys 113, 112 and 117; the linear movements of the two cables 118 are in the same direction and at the same rate, and preferably they are caused to move at the same rate as the fruit to minimize frictional engagement of the sides of the fruit and the cables.

After the apparatus is thus set in operation, peaches or other fruit to be oriented with the cleft downward are dropped one by one, either manually or by any suitable automatic feeding mechanism well known in the art, down chute 140 between pulleys 117 at the front or feed end of guides 70a and 70b. Paddles 26 moved by chain 25 engage the fruit and move it forward linearly. Meanwhile, cable 30, moving linearly at the same rate as the fruit and rotating about its axis, imparts to each fruit a rapid spinning motion about its horizontal axis. The result of this rapid spinning motion is that, before the fruit has traversed any great linear distance, it becomes oriented with the cleft downward and directly over cable 30 and the suture vertically disposed and in the plane of the axis of cable 30. At the moment when this alignment occurs, the edges 67 (Fig. 4) of locating plates 66 come into operation by engaging the sides of the fruit just below the points where cable 30 is tangent to the skin of the fruit. The edges 67 thus hold the fruit sufficiently away from cable 30, or at least decrease the frictional engagement of cable 30 and the skin of the fruit, so that the fruit no longer spins about its horizontal axis. The fruit then continues its travel to the removal station without this alignment being disturbed. Thus, by the time the fruit has traversed the length of the guides 70a and 70b, it will have been oriented in such a way that it can be picked upwardly by hand or automatically and thrust onto an impaling element or a slitting or halving knife without the necessity of aligning the fruit for the slitting or halving operation.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Apparatus for orienting peaches and other like fruit, comprising continuously propelling means for moving the fruit continuously from a delivery station toward a removal station; a rotating member rotating about an axis parallel to the direction of movement of the fruit and adapted to engage the fruit and impart thereto a spinning motion about an axis parallel to said direction of movement, said rotating member also being adapted to move linearly in the direction of and at the same rate as the movement of fruit; and means whereby said rotating member is rendered inoperative to impart further spinning motion to the fruit when the fruit has become oriented with its cleft and suture aligned with said rotating member.

2. The apparatus of claim 1, wherein said means for rendering the rotating member inoperative comprises two spaced opposing, longitudinally extended members defining a passageway for said rotating member and having inwardly slanting edges terminating short of the top of the rotating member and at such a level that, when the fruit is oriented with its cleft and suture aligned with the rotating member, said edges engage the fruit and break its engagement with the rotating member.

3. The apparatus of claim 2, wherein said rotating member is a cable.

4. Apparatus for orienting peaches with the suture plane in vertical position and the cleft downwards, comprising a pair of spaced, vertically disposed wheels, an endless belt member looped about said wheels, laterally projecting propelling members spaced along and secured to said belt member and each adapted to engage and propel a peach forward, laterally projecting supporting members radially spaced about and secured to each said wheel so as to rotate therewith, an endless cable member looped about the said supporting members of each wheel, and means associated with said supporting members and operated by rotation of the wheels to impart a spinning motion to said cable member about its axis.

5. The apparatus of claim 4, in combination with a structure disposed between said wheels, serving to define a passageway for the upper course of said cable member and operative to engage the fruit and break its engagement with the cable member when in oriented position with the cleft and suture plane aligned with the cable member.

6. The apparatus of claim 5, wherein said structure comprises a longitudinally extended grooved member defining and serving as a channel for said cable member along its upper course between said spaced wheels, said grooved member having inwardly tapering side portions terminating short of the top of the cable member such that, when a peach has been oriented with its cleft and suture in alignment with the cable member, said side portions engage the sides of the peach within the cleft and break the engagement of the peach and the cable member.

7. Apparatus for orienting peaches comprising a pair of spaced wheels arranged in a vertical plane, an endless conveyor member carried by said wheels and adapted to convey peaches from a receiving station to a delivery station, a plurality of pairs of adjacent and overlapping rollers for each said wheel, means mounting said pairs of rollers radially of the axes of rotation of said wheels and spaced from said wheels so as to rotate at the same rate and in the same direction as the wheels, an endless cable member carried by said rollers, and means operable by rotation of said wheels to impart rotary motion to said rollers to spin said cable member about its longitudinal axis.

8. The apparatus of claim 7, in combination with a grooved member disposed between said wheels defining a channel for the upper course of said cable member and having inwardly tapering side portions terminating short of the top of the cable member such that, when a peach has been oriented with its cleft and suture aligned with the cable member, said side portions engage the sides of the peach within the cleft and break the engagement of the peach and the cable member.

9. The apparatus of claim 8, including lateral guide means for providing lateral support for the peach, comprising a pair of members disposed above and on opposite sides of said grooved member and each adapted to carry and move linearly, in the direction of travel of the peach, an endless cable in such position as to engage a side of the peach.

10. Apparatus for orienting peaches with the cleft downwards and the suture plane vertical comprising a pair of spaced sprocket wheels rotatable on horizontal axes and lying in a vertical plane, positive means for rotating one such sprocket wheel, an endless chain member carried by said sprocket wheels, laterally projecting members spaced along and secured to said chain adapted to engage successive peaches and to propel them forwardly in succession, a plurality of pairs of adjacent, overlapping rollers for each said sprocket wheel, means mounting said pairs of rollers in fixed relationship to said wheels so as to define a cusp-shaped path for engaging a cable, said path having substantially the same radius as said sprocket wheels, gearing associated with and operated by said sprocket wheels operable to rotate said rollers at the same rate and in the same direction, and an endless cable carried by said rollers.

11. The apparatus of claim 10, including a grooved member supporting and defining a path for the upper course of said cable and having inwardly projecting side portions terminating short of the top of the cable and operative to engage the sides of the peach and break its engagement with the cable when the cleft and suture of the peach are aligned with the cable.

12. The apparatus of claim 11, including a pair of lateral guide members disposed above and on opposite sides of said grooved member, each comprising a longitudinally extended guide plate provided with a longitudinal groove facing the peach, horizontally disposed pulley members disposed at opposite ends of each guide plate, an endless pulley cable looped about the pulley members of each guide plate and engaging the groove of the guide plate along its inner course, and means for rotating the pulley members so as to give the endless pulley cables a linear movement in the same direction as the movement of the peaches.

13. A peach orienting machine comprising conveyor means for conveying peaches from a receiving station to a delivery station, and orienting means comprising a longitudinal member having its axis parallel to the path of travel of the fruit between said stations, and means for simultaneously rotating said longitudinal member about its longitudinal axis and imparting linear movement thereto along said path of travel.

14. A peach orienting machine comprising conveyor means for conveying peaches from a receiving station to a delivery station, and orienting means comprising an endless cable member having its axis parallel to the path of travel of the fruit between said stations, and means for moving said endless cable member linearly and simultaneously imparting a spinning motion thereto.

15. A peach orienting machine comprising conveyor means for conveying peaches from a receiving station to a delivery station, and orienting means comprising an endless cable member having its axis parallel to the path of travel of the fruit between said stations, and means for moving said endless cable member linearly and simultaneously imparting a spinning motion thereto, a pair of cables disposed above and on opposite sides of said endless cable member, and means for imparting linear movement to said cables in the direction of movement of the fruit

LAWRENCE W. WATERS.

REFERENCES CITED

The following references are of record in the file of this patent:

UNITED STATES PATENTS

| Number | Name | Date |
|---|---|---|
| 2,212,892 | Ashlock | Aug. 27, 1940 |
| 2,213,893 | Ashlock | Sept. 3, 1940 |